United States Patent
Beuque (10) Patent No.: US 7,231,525 B1
(45) Date of Patent: Jun. 12, 2007

(54) AUTHENTIFICATION OF DATA IN A DIGITAL TRANSMISSION SYSTEM

(75) Inventor: Jean-Bernard Gérard Maurice Beuque, Bois-Colombes (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 09/646,845

(22) PCT Filed: Mar. 25, 1999

(86) PCT No.: PCT/IB99/00621

§ 371 (c)(1),
(2), (4) Date: Sep. 22, 2000

(87) PCT Pub. No.: WO99/49614

PCT Pub. Date: Sep. 30, 1999

(30) Foreign Application Priority Data

Mar. 25, 1998 (EP) .................................. 98400686

(51) Int. Cl.
*H04L 9/00* (2006.01)
*G06F 12/14* (2006.01)
(52) U.S. Cl. .................. 713/181; 713/161; 713/193
(58) Field of Classification Search ................ 713/181, 713/161, 193
See application file for complete search history.

(56) References Cited

U.S. PATENT DOCUMENTS 5,781,629 A * 7/1998 Haber et al. ................ 713/177

FOREIGN PATENT DOCUMENTS

| EP | 0 752 786 A1 | 1/1997 |
| EP | 0 781 003 A2 | 6/1997 |
| HU | 216 231 B | 8/1997 |

OTHER PUBLICATIONS

Novelty Search Report from the Hungarian Patent Office Dated: Apr. 3, 2003 (1 page).

* cited by examiner

*Primary Examiner*—Kambiz Zand
*Assistant Examiner*—Thomas Szymanski
(74) *Attorney, Agent, or Firm*—Osha Liang LLP (57) ABSTRACT

A method of authentification of data sent in a digital transmission characterized by the organization and authentification of the data prior to transmission into a hierarchy of at least one root directory unit (75), subdirectory unit (76) and file unit (77), data in a file (77) being acted upon by an authentification algorithm and an associated file authentification value (82) stored in the referring subdirectory unit (77), this file authentification value (82) being in turn acted upon by an authentification algorithm and an associated subdirectory authentification value (79) stored in the referring root directory. Other aspects of the invention relate to the authentification of a second root directory (78) by generation of a second authentification value (83) and the authentification of data before encapsulation in tables or sections of a transport stream.

19 Claims, 7 Drawing Sheets

AUTHENTIFICATION OF DATA IN A DIGITAL TRANSMISSION SYSTEM

The present invention relates to a method of authentication of data sent in a digital transmission system.

Broadcast transmission of digital data is well-known in the field of pay TV systems, where scrambled audiovisual information is sent, usually by satellite or satellite/cable link, to a number of subscribers, each possessing a decoder capable of descrambling the transmitted program for subsequent viewing. Terrestrial digital broadcast systems are also known. Recent systems have also used the broadcast link to transmit other data, in addition to or as well as audiovisual data, such as computer programs or interactive applications to the decoder or to a connected PC.

A particular problem with the transmission of application data lies in the need to verify the integrity and origin of any such data. Since data of this kind may be used to reconfigure the decoder, as well as implementing any number of interactive applications, it is essential that the received data is both complete and identified as originating from a known source. Otherwise, operational problems linked to downloading of incomplete data may arise, as well as the risk that the decoder becomes open to attacks by third parties or the like.

Previous attempts to authenticate such data have concentrated on the verification at the level of encapsulation or formatting of data in a packet stream. For example, the European patent application EP 0752786 describes a system in which data is encapsulated in a series of modules or, using the terminology associated with the MPEG standard, a series of tables or sections, the tables or sections then being encapsulated in packets in an MPEG transport stream.

Authentification operations are carried out in relation to the tabulated data, a directory table containing, for example, a list of all tables containing data for that application together with a list of hash values associated with each table to permit later verification of table data. The directory table itself may be signed prior to transmission, such that the information in the directory table and the associated tables may not be modified without changing the hash and signature values.

The problem with such known systems lies in their unsuitability for handling more complex data organisation structures. In particular, the use of a single directory table containing a complete list of hash values for each associated table means that such systems cannot easily be adapted to handle large or variable numbers of tables.

The system is equally ill adapted to permit authentification of software provided by a number of broadcast operators, since a single MPEG directory table links all tables and since the authentification operations are carried out at the stage of formatting the data in tables for packet encapsulation and broadcast. This operation is usually carried out under the control of a sole operator.

According to a first aspect of the present invention, there is provided a method of authentification of data sent in a digital transmission system characterised by the organisation of the data prior to transmission into a hierarchy of at least one root directory unit, subdirectory unit and file unit, data in a file being acted upon by an authentification algorithm and an associated file authentification value stored in the referring subdirectory, this file authentification value being in turn acted upon by an authentification algorithm and an associated subdirectory authentification value stored in the referring root directory.

Unlike known systems, where a single table directory refers to all the associated tables, the use of a multiple hierarchy structure together with the application of an authentification algorithm at each step in the hierarchy provides a secure and modularised data structure. As a file authentification value in a subdirectory is in turn authentified at an upper level by a corresponding value in the root directory, it is not possible to change one element in a lower level without changing the authentifying values at a higher level (and vice versa).

Preferably, authentification of the file data is carried out by applying a hashing algorithm to some or all of the file data, the resulting hash value being stored as the file authentification value in the referring subdirectory. Equally, authentification of a subdirectory may be carried out by applying a hashing algorithm to the file authentification value (and other data, if desired), the resulting hash value being stored as the subdirectory authentification value in the referring root directory.

Other embodiments may be envisaged, for example, where file data is encrypted in accordance with an encryption algorithm and the encryption key (or its identifying key number) used as the authentification value stored in the subdirectory. This file key may in turn be encrypted and the encrypting key stored in the root directory as the authentification value etc. Whilst possible, this embodiment is rather more complicated to put into place due to the increased complexity of the operations necessary to generate encryption key values.

In contrast, the use of hashing algorithm to carry out the authentification of each module enables a particularly simple and rapid check of the integrity of each module to be carried out. In one embodiment, a simple hashing algorithm such as a checksum calculation may be used. However, this would not enable a detection of falsification, since it is relatively simple to determine how any change in a message affects the hash value.

Preferably, the hashing algorithm corresponds to a cryptographically secure algorithm that generates a substantially unique hash value from a given set of data. Suitable hashing algorithms that may be used for this purpose include, for example, the Message Digest version 5 (MD5) algorithm or the Secure Hash Algorithm (SHA).

Advantageously, authentification of file data for a plurality of files is carried out by applying a hashing algorithm to an accumulation of data from a plurality of files to generate a single hash value. Equally, authentification of a number of subdirectories may be carried out by applying a hashing algorithm to an accumulation of file authentification values from a plurality of subdirectories (and other data, if desired) to generate a single hash value.

The use of a cumulative hashing process to cover a plurality of data modules (files, subdirectories etc.) at a lower layer further simplifies the system in comparison, for example, with systems which store list of individual hash values for each module. This again enables the system to reduce the calculation steps needed at each level and reduces the size of authentification data stored in an upper layer.

In the case of the embodiments using a hashing algorithm to authenticate each layer, the system will be "open", that is, all the hash values will be readable up to the root directory. Since hashing algorithms are publically available, a third party could theoretically change stored data e.g. at a file level without detection if the corresponding hash values at subdirectory and root directory level were also changed at the same time.

In order to avoid this, at least some of the data stored in the root directory is acted upon by a secret key of an encryption algorithm and the resulting encrypted value stored in the root directory. Preferably, the encrypted value corresponds to a digital signature. Suitable private/public key algorithms for this purpose include, for example, the RSA algorithm.

Advantageously, the data encrypted by the secret key to generate a signature stored in the root directory comprises at least one or more subdirectory authentification values. It is nevertheless possible to envisage data in the root directory other than the subdirectory authentification values being signed in order to "close" the system.

In an alternative to the generation of a signature, the whole or part of the root directory may simply be encrypted or scrambled, the receiver possessing an equivalent key to decrypt the encrypted root directory data. In this case, a symmetric key algorithm such as DES may be used.

As will be understood, whilst the authentification process has been described above with reference to two hierarchical levels, similar authentification steps may be carried out ad infinitum for further referred files, subdirectories, root directories, etc.

Similarly, whilst the structure has been defined as root directory/subdirectory/file for the sake of clarity of language, no particular characteristic of each unit in a layer is assumed, other than the referral to a lower layer unit by two upper layer units. As will be understood, the data structure may just as equally be root directory/subdirectory/second root directory or any other combination.

The following described embodiments focus on a unit in a lower layer, i.e. referred to by a directory or subdirectory. As will become clear, although referred to from an upper layer, this unit may nevertheless itself be a directory unit, subdirectory unit etc.

In one embodiment, one referred unit includes an encrypted value generated by a secret key, an authentification value for this unit being calculated based on the results of an authentification algorithm on the encrypted value and stored in the referring unit. In particular, as with the equivalent root directory embodiment described above, a referred unit may be signed, the authentification value for that unit being calculated as the result of a hashing function on that signature.

The referred unit may correspond, for example, to a file or subdirectory. However, this embodiment is particularly adapted to the situation in which the referred unit is a root directory for a further set of data, e.g. data of a different origin and where the referred root unit also includes a signature. In this case, a first operator can assemble and sign data up to the level of the root directory.

Thereafter, a second operator can refer to this data without knowing the encryption key, any link simply being authentified in the referring unit by the hash value of the signature. In the referred root directory. Authentification of both sets of data will of course only be possible to a receiver possessing the necessary keys to verify the signatures in both root directories.

As described above, the present invention may be applied to any set of multiple hierarchy data units. It may even be applied to the organisation of tables or packets in a transport stream, if multiple levels of root directory, subdirectory, file etc. can be provided in a packet stream. However, this invention is particularly applicable to the case in which the units correspond to a set of data files encapsulated in data tables or sections, these tables being thereafter encapsulated in data packets to form a transport stream.

Unlike authentification at the packet or table level, this embodiment enables complete independence between the assembly of authentified data and its encapsulation in a transport stream and, again, facilitates the supply of software from different sources in the transport stream controlled by a single broadcast operator. Data authentified according to this embodiment may even be transmitted via different transmission routes (e.g. a bidirectional telecom link or a satellite link), using alternative encapsulation formats to transmit the data.

Data units preferably correspond to data objects formatted according to the DSMCC standard. In one embodiment, the data objects are thereafter encapsulated in tables and packets conforming to the MPEG standard.

According to a second aspect of the present invention there is provided a method of authentification of a first and second set of linked data units sent in a digital transmission system, characterised in that at least one of the first set of units includes a signature generated by a secret key acting on that first unit, at least this signature value being authentified by an authentification algorithm and the authentification value being stored in a unit in the second set of units that refers to that first unit.

According to a third aspect of the present invention there is provided a method of authentification of data sent in a digital transmission system, characterised in that data is organised in a series of data files, authentification being carried out between files independently of and prior to the stage or stages of formatting and encapsulation of data used by the digital transmission system to prepare data for transmission in a packet transport stream.

In particular, authentification may be carried out prior to formatting in tables or sections, the tables then being encapsulated in data packets in the transport packet stream.

As mentioned above, the use of an authentification process applied prior to the preparation of data for transmission has the effect that the data may thereafter routed to a receiver by any number of channels, such as a broadcast channel or a telecom channel without changing the authentification process. Equally, once a receiver or decoder has reconstituted the data files from the format associated with the transmission route, a verification may be carried out on this data, independently of the transmission mode chosen.

Any or all of the features of the first aspect of the invention and its preferred embodiments may of course be combined with the second and third aspects of the invention.

The present invention has been described above in relation to the steps for generating authentification data prior to transmission. The invention in its broadest and preferred embodiments equally applies to the reverse steps carried out at a receiver for verifying this data.

In its broadest aspects, the present invention may be applied to any digital transmission system. However, the invention is preferably applied to a digital television system and, in particular, to data modules carrying application software for use in a receiver/decoder of the digital television system.

As used herein, the term "digital transmission system" includes any transmission system for transmitting or broadcasting for example primarily audiovisual or multimedia digital data. Whilst the present invention is particularly applicable to a broadcast digital television system, the invention may also be applicable to a fixed telecommunications network for multimedia internet applications, to a closed circuit television, and so on. As will be understood, the term "digital television system" includes for example any satellite, terrestrial, cable and other system.

The term "receiver/decoder" or "decoder" used in the present application may connote a receiver for receiving either encoded or non-encoded signals, for example, television and/or radio signals, which may be broadcast or transmitted by some other means. The term may also connote a decoder for decoding received signals. Embodiments of such receiver/decoders may include a decoder integral with the receiver for decoding the received signals, for example, in a "set-top box", such a decoder functioning in combination with a physically separate receiver, or such a decoder including additional functions, such as a web browser and/or integrated with other devices such as a video recorder or a television.

The term MPEG refers to the data transmission standards developed by the International Standards Organisation working group "Motion Pictures Expert Group" and in particular but not exclusively the MPEG-2 standard developed for digital television applications and set out in the documents ISO 13818-1, ISO 13818-2, ISO 13818-3 and ISO 13818-4. In the context of the present patent application, the term includes all variants, modifications or developments of MPEG formats applicable to the field of digital data transmission.

The term DSMCC refers to the data file format standards described in the MPEG documents and in the current document ISO 13818-6.

There will now be described, by way of example only, a preferred embodiment of the invention with reference to the attached figures, in which.

Figure 1:
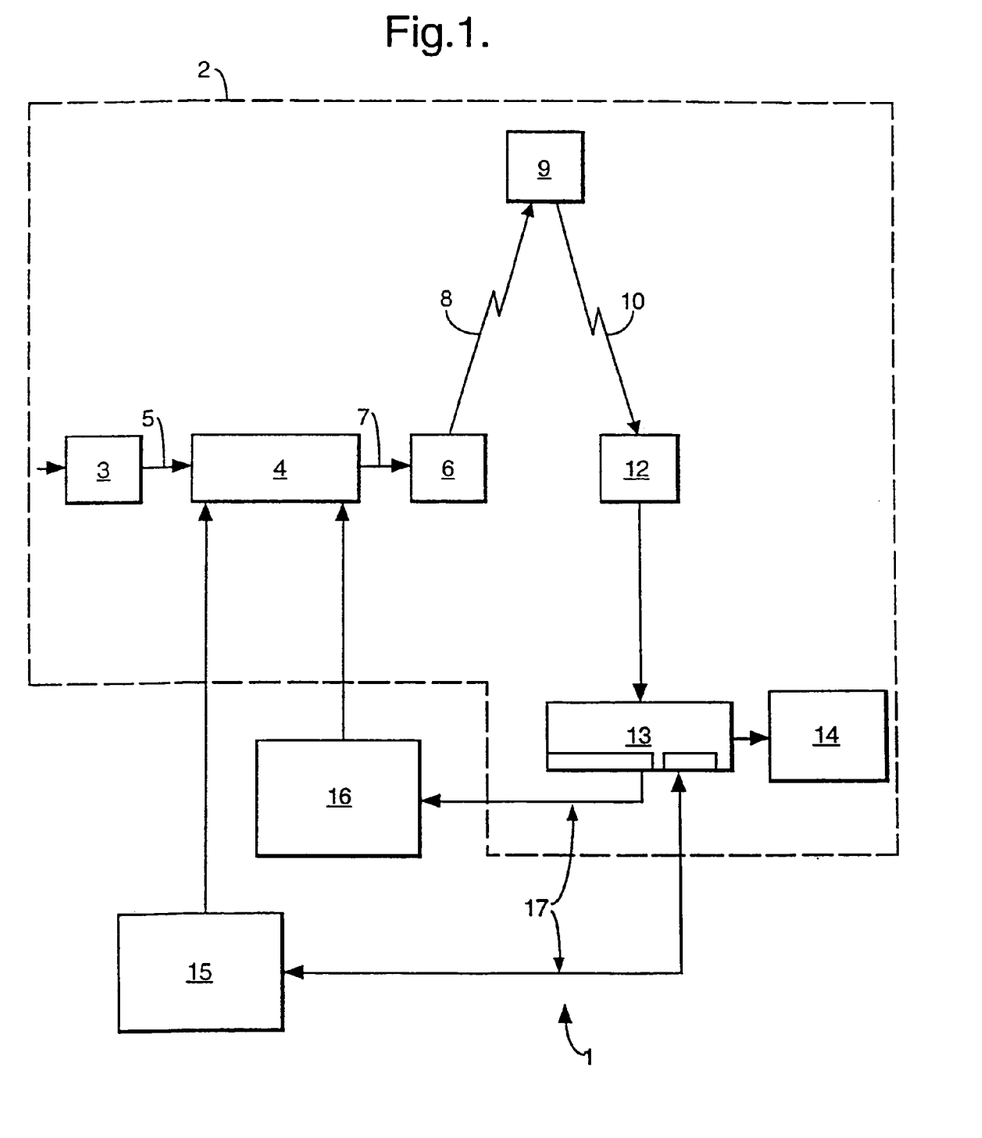
FIG. 1 shows the schematic outline of a digital television system for use with the present invention.

An overview of a digital television system 1 according to the present invention is shown in FIG. 1. The invention includes a mostly conventional digital television system 2 that uses the known MPEG-2 compression system to transmit compressed digital signals. In more detail, MPEG-2 compressor 3 in a broadcast centre receives a digital signal stream (typically a stream of video signals). The compressor 3 is connected to a multiplexer and scrambler 4 by linkage 5.

The multiplexer 4 receives a plurality of further input signals, assembles the transport stream and transmits compressed digital signals to a transmitter 6 of the broadcast centre via linkage 7, which can of course take a wide variety of forms including telecommunications links. The transmitter 6 transmits electromagnetic signals via uplink 8 towards a satellite transponder 9, where they are electronically processed and broadcast via notional downlink 10 to earth receiver 12, conventionally in the form of a dish owned or rented by the end user. The signals received by receiver 12 are transmitted to an integrated receiver/decoder 13 owned or rented by the end user and connected to the end user's television set 14. The receiver/decoder 13 decodes the compressed MPEG-2 signal into a television signal for the television set 14.

Other transport channels for transmission of the data are of course possible, such as terrestrial broadcast, cable transmission, combined satellite/cable links, telephone networks etc.

In a multichannel system, the multiplexer 4 handles audio and video information received from a number of parallel sources and interacts with the transmitter 6 to broadcast the information along a corresponding number of channels. In addition to audiovisual information, messages or applications or any other sort of digital data may be introduced in some or all of these channels interlaced with the transmitted digital audio and video information. In such a case, a stream of digital data in the form, for example, of DSM-CC format software files and messages, will be compressed and packetised into the MPEG format by the compressor 3. The downloading of software modules will be described in greater detail below.

A conditional access system 15 is connected to the multiplexer 4 and the receiver/decoder 13, and is located partly in the broadcast centre and partly in the decoder. It enables the end user to access digital television broadcasts from one or more broadcast suppliers. A smartcard, capable of deciphering messages relating to commercial offers (that is, one or several television programmes sold by the broadcast supplier), can be inserted into the receiver/decoder 13. Using the decoder 13 and smartcard, the end user may purchase commercial offers in either a subscription mode or a pay-per-view mode. In practice, the decoder may be configured to handle multiple access control systems, e.g. of the Simulcrypt or Multicrypt design.

As mentioned above, programmes transmitted by the system are scrambled at the multiplexer 4, the conditions and encryption keys applied to a given transmission being determined by the access control system 15. Transmission of scrambled data in this way is well known in the field of pay TV systems. Typically, scrambled data is transmitted together with a control word for descrambling of the data, the control word itself being encrypted by a so-called exploitation key and transmitted in encrypted form.

The scrambled data and encrypted control word are then received by the decoder 13 having access to an equivalent of the exploitation key stored on a smart card inserted in the decoder to decrypt the encrypted control word and thereafter descramble the transmitted data. A paid-up subscriber will receive, for example, in a broadcast monthly EMM (Entitlement Management Message) the exploitation key necessary to decrypt the encrypted control word so as to permit viewing of the transmission. In addition to their use in decrypting audiovisual television programs, similar exploitation keys may be generated and transmitted for use in the verification of other data such as software modules as will be described below.

An interactive system 16, also connected to the multiplexer 4 and the receiver/decoder 13 and again located partly in the broadcast centre and partly in the decoder, enables the end user to interact with various applications via a modem back channel 17. The modem back channel may also be used for communications used in the conditional access system 15. An interactive system may be used, for example, to enable the viewer to communicate immediately with the transmission centre to demand authorisation to watch a particular event, download an application etc.

Figure 2:
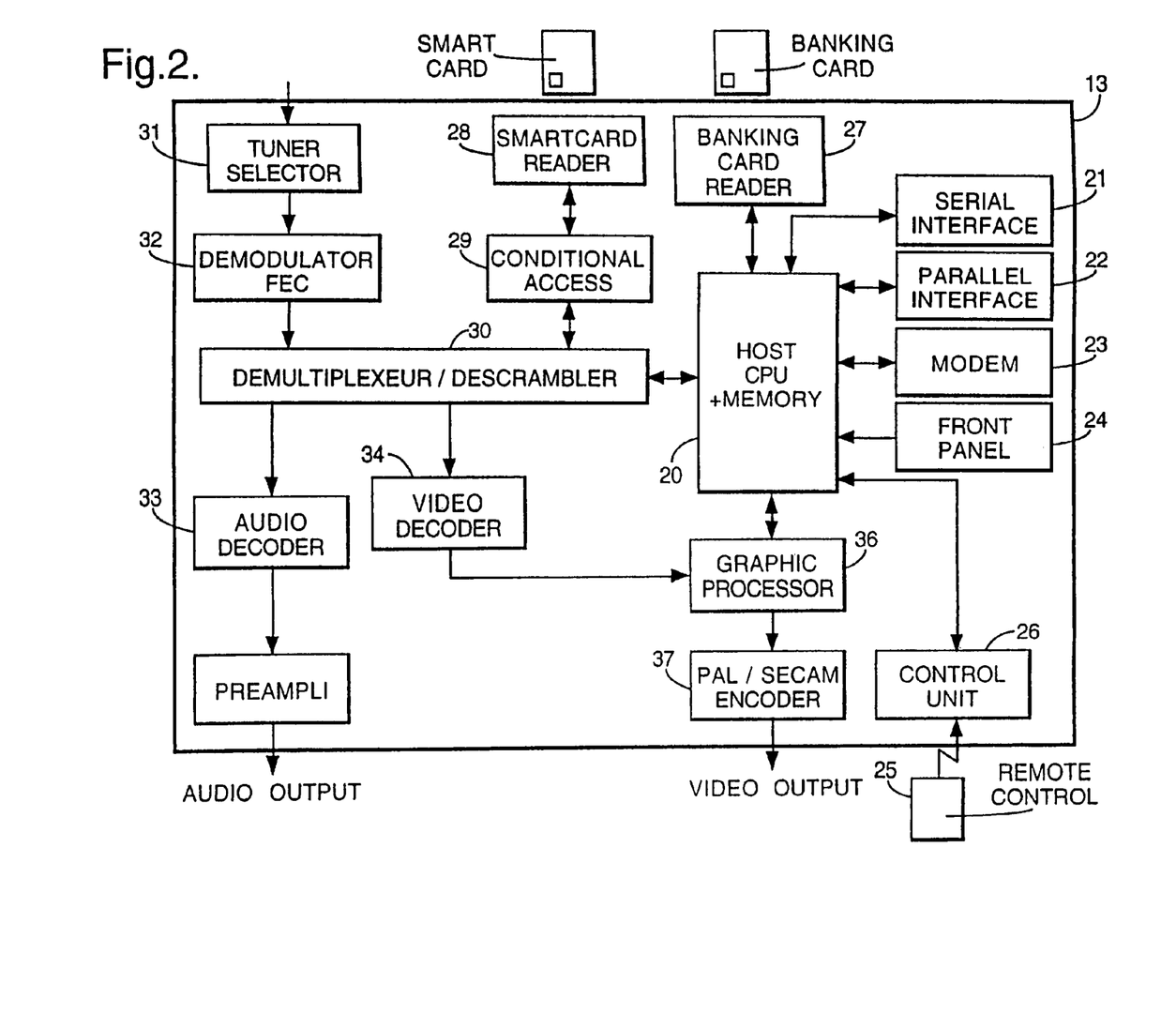
FIG. 2 shows the structure of a decoder of the system of FIG. 1.

Referring to FIG. 2, the physical elements of the receiver/decoder 13 or set-top box adapted to be used in the present invention will now be briefly described. The elements shown in this figure will be described in terms of functional blocks.

The decoder 13 comprises a central processor 20 including associated memory elements and adapted to receive input data from a serial interface 21, a parallel interface 22, and a modem 23 (connected to the modem back channel 17 of FIG. 1).

The decoder is additionally adapted to receive inputs from an infra-red remote control 25 via a control unit 26 and from switch contacts 24 on the front panel of the decoder. The decoder also possesses two smartcard readers 27, 28 adapted to read bank or subscription smartcards 29, 30 respectively. Input may also be received via an infra-red keyboard (not shown). The subscription smartcard reader 28 engages with an inserted subscription card 30 and with a conditional access unit 29 to supply the necessary control word to a demultiplexer/descrambler 30 to enable the encrypted broadcast signal to be descrambled. The decoder also includes a conventional tuner 31 and demodulator 32 to receive and demodulate the satellite transmission before being filtered and demultiplexed by the unit 30.

Processing of data within the decoder is generally handled by the central processor 20. The software architecture of the central processor corresponds to a virtual machine interacting with a lower level operating system implemented in the hardware components of the decoder.

There will now be described, with reference to FIGS. 3 and 4, the packet structure of data within the broadcast MPEG transport stream sent from the transmitter to the decoder. As will be appreciated, whilst the description will focus on the tabulation format used in the MPEG standard, the same principles apply equally to other packetised data stream formats.

Figure 3:
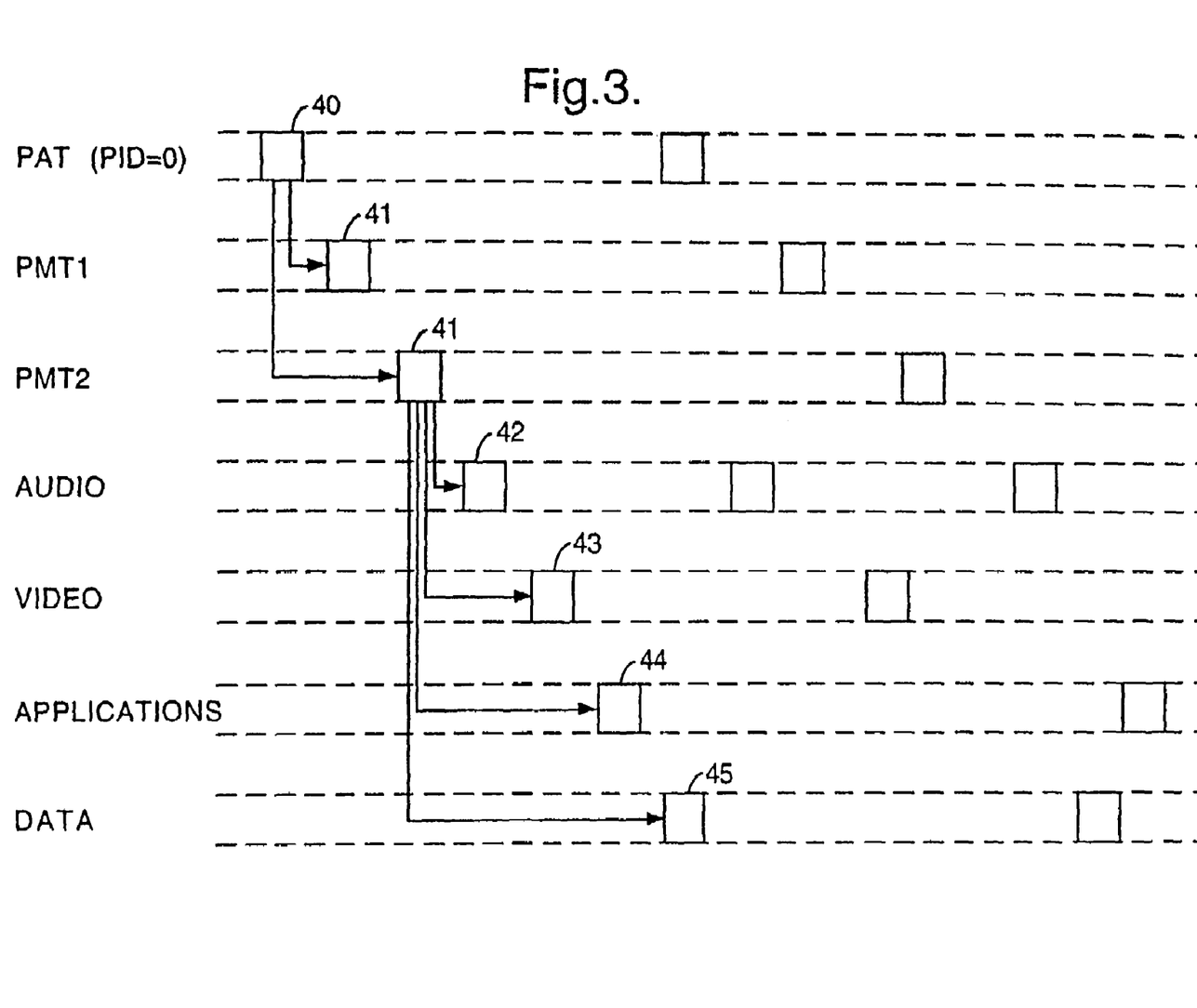
FIG. 3 shows the structure of a number of components within the MPEG broadcast transport stream.

Referring in particular to FIG. 3, an MPEG bitstream includes a programme access table ("PAT") 40 having a packet identification ("PID") of 0. The PAT contains references to the PIDs of the programme map tables ("PMTs") 41 of a number of programmes. Each PMT contains a reference to the PIDs of the streams of the audio MPEG tables 42 and video MPEG tables 43 for that programme. A packet having a PID of zero, that is the programme access table 40, provides the entry point for all MPEG access.

In order to download applications and data for them, two new stream types are defined, and the relevant PMT also contains references to the PIDs of the streams of application MPEG tables 44 (or sections of them) and data MPEG tables 45 (or sections of them). In point of fact, whilst it may be convenient in some cases to define separate stream types for executable application software and data for processing by such software, this is not essential. In other realisations, data and executable code may be assembled in a single stream accessed via the PMT as described.

Figure 4:
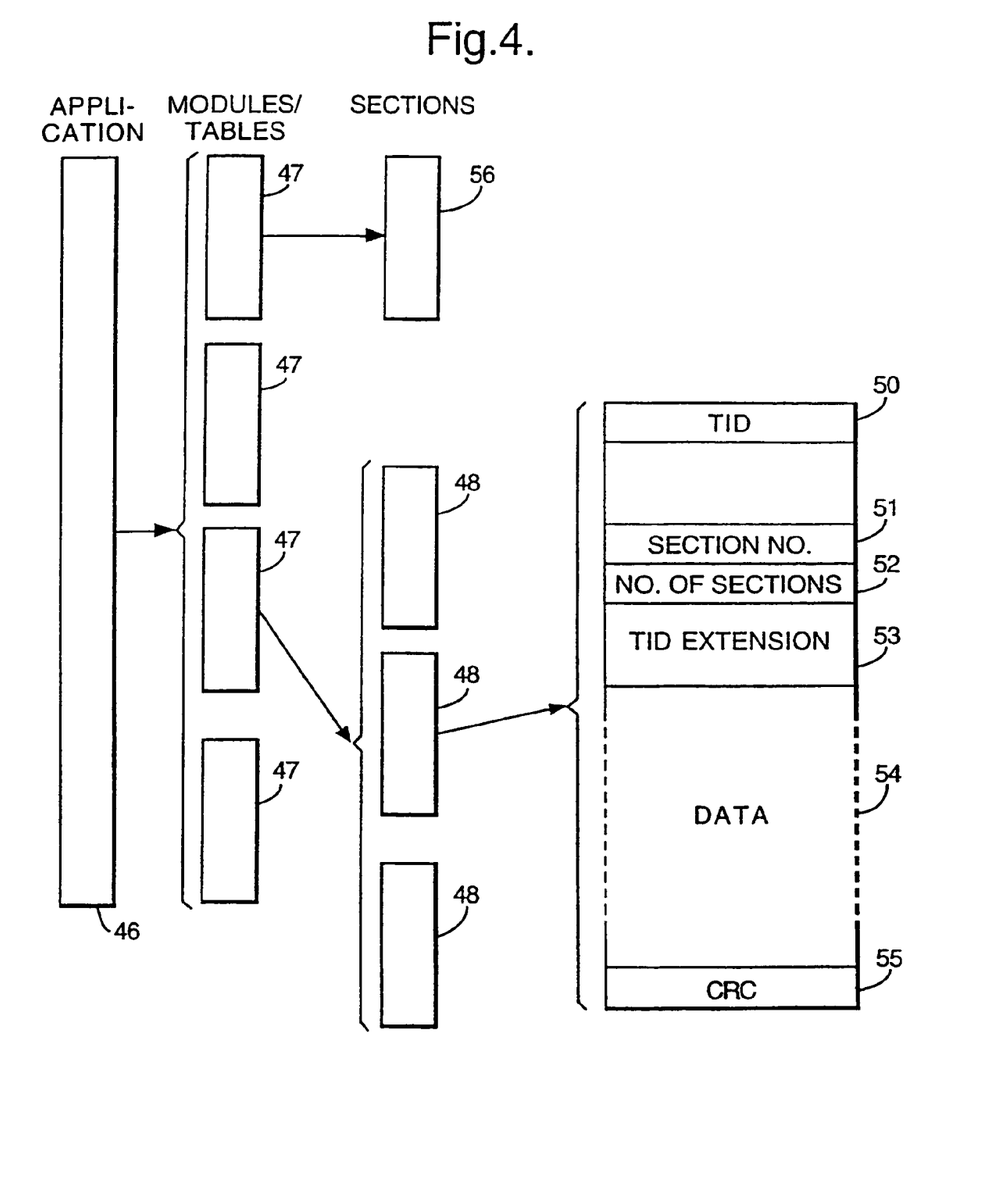
FIG. 4 shows the division of a software application into a number of MPEG tables.

Referring to FIG. 4, in order to download, for example, an application within a stream 44, the application 46 is divided into modules 47, each formed by an MPEG table. Some of these tables comprise a single section whilst others may be made up by a plurality of sections 48. A typical section 48 has a header, which includes a one-byte table identification ("TID") 50, the section number 51 of that section in the table, the total number 52 of sections in that table and a two-byte TID extension reference 53. Each section also includes a data part 54 and a CRC 55. For a particular table 47, all of the sections 48 making up that table 47 have the same TID 50 and the same TID extension 53. For a particular application 46, all of the tables 47 making up that application 46 have the same TID 50, but different respective TID extensions.

For each application 46, a single MPEG table is used as a directory table 56. The directory table 56 has, in its header, the same TID as the other tables 47 making up the application. However, the directory table has a predetermined TID extension of zero for identification purposes and due to the fact only a single table is needed for the information in the directory. All of the other tables 47 will normally have non-zero TID extensions and are composed of a number of associated sections 48. The header of the directory table also includes a version number of the application to be downloaded.

Referring back to FIG. 3, the PAT 40, PMTs 41 and application and data stream components 44, 45 are cyclically transmitted. Each application which is transmitted has a respective predetermined TID. To download an application, the MPEG table having the appropriate TID and a TID extension of zero is downloaded to the receiver/decoder. This is the directory table for the required application. The data in the directory is then processed by the decoder to determine the TID extensions of the tables making up the required application. Thereafter any required table having the same TID as the directory table and a TID extension determined from the directory can be downloaded.

The decoder is arranged to check the directory table for any updating of it. This may be done by downloading the directory table again periodically, for example every 30 seconds, or one or five minutes, and comparing the version number of the previously downloaded directory table. If the freshly downloaded version number is that of a later version, then the tables associated with the previous directory table are deleted, and the tables associated with the new version downloaded and assembled.

In an alternative arrangement, the incoming bitstream is filtered using a mask corresponding to the TID, TID extension and version number, with values set for the TID of the application, a TID extension of zero and a version number one greater than the version number of the currently downloaded directory. Accordingly, an increment of the version number can be detected, and once detected the directory is downloaded and the application is updated, as described above. If an application is to be terminated, an empty directory with the next version number is transmitted, but without any modules listed in the directory. In response to receipt of such an empty directory, the decoder 2020 is programmed to delete the application.

In practice, software and computer programs to implement applications in the decoder may be introduced via any of the parts of the decoder, in particular in the datastream received via the satellite link as described, but also via the serial port, the smartcard link etc. Such software may comprise high level applications used to implement interactive applications within the decoder, such as net browsers, quiz applications, program guides etc. Software may be also be downloaded to change the working configuration of the decoder software, for example by means of "patches" or the like.

Applications may also be downloaded via the decoder and sent to a PC or the like connected to the decoder. In such a case, the decoder acts as a communication router for the software, which is eventually run on the connected device. In addition to this routing function, the decoder may also function to convert the MPEG packetised data before routing to the PC into computer file software organised, for example, according to the DSMCC protocol (see below).

Previously, measures implemented to verify the completeness and origin of application data have focussed on verifying the tables in the MPEG packet stream. In particular, in conventional systems, a hash function is applied to each of the individual sections 48 prior to transmission and the resulting check value or signature for each section stored in a list in the directory table 56 sent to the decoder. Comparing the hash value subsequently calculated by the decoder with the check value stored in the directory for a received section enables the integrity of the received section to be verified.

Data within the directory 40 may equally be subject to a hashing process to generate a further check value or signature for the directory table 40. Furthermore, this checking value can be encrypted by a private key and stored in the directory table. Only those decoders possessing a corresponding public key may authentificate the signature.

In contrast to such conventional systems, the present embodiment relates to a means for securing and verifying application data organised in a multiple hierarchy of data files or objects at the level of the application. This will be understood more clearly from FIG. 5 which shows the relationship between data organised in a set of DSMCC U—U data files 60, in an assembled application 46 and as encapsulated within a series of MPEG tables 47.

Figure 5:
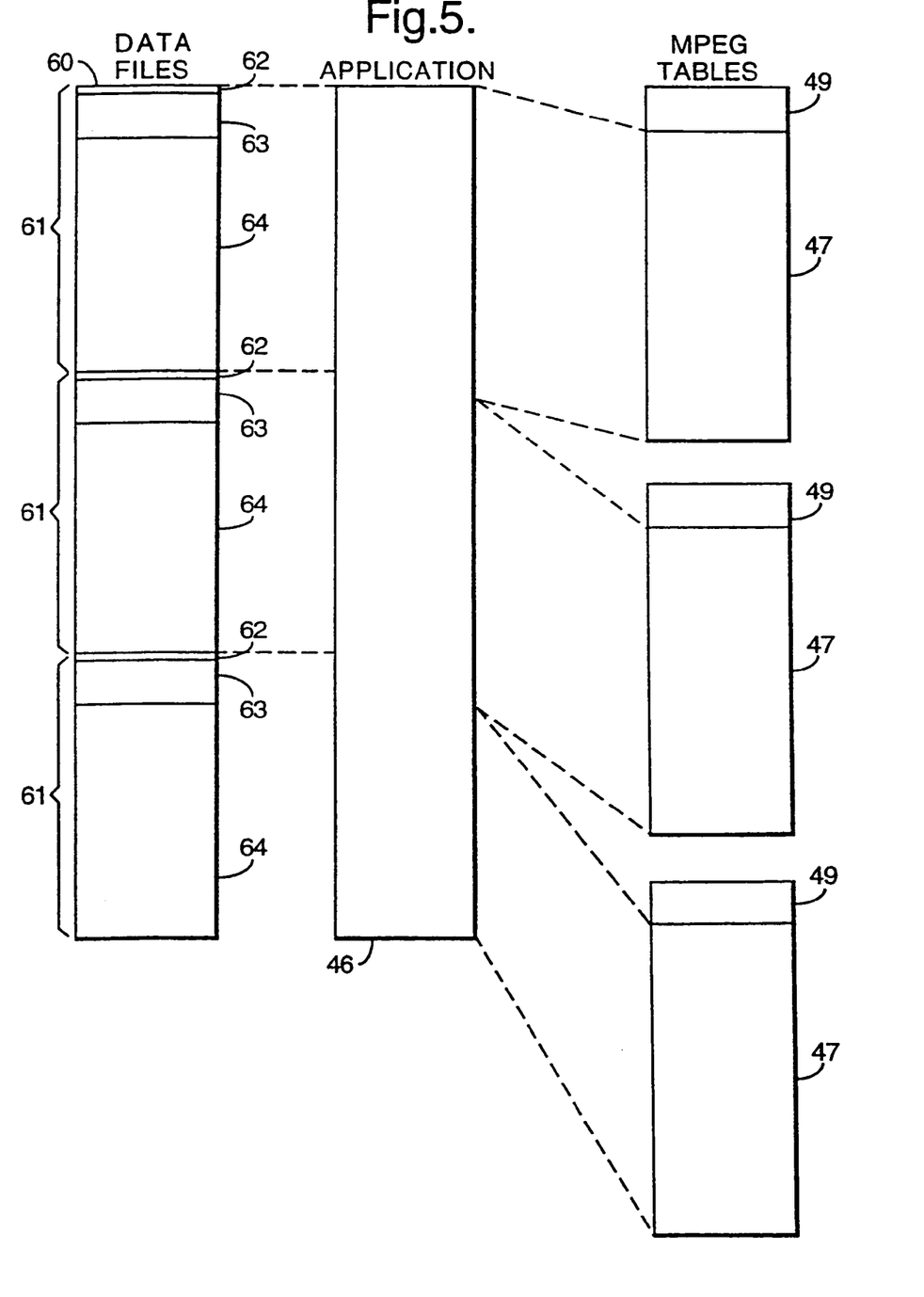
FIG. 5 shows the relationship between DSMCC data files and the eventually produced MPEG tables.

Prior to transmission, the data files are assembled into the application 46 and, thereafter, formatted by an MPEG compressor into MPEG tables or modules 47, as described above, including a header 49 specific to the MPEG packet stream and including table ID, version number etc. These tables are then encapsulated by the MPEG compressor into MPEG packets. As will be appreciated, there may be no fixed relation between the data organised in the data files 61 and the eventual MPEG tables 47. After reception and filtering by the decoder, the packet headers are discarded and the series of tables is reconstituted from the payload of the broadcast packets. Thereafter, the table headers 49 are discarded and the application 46 reconstituted from the payload of the tables 47.

The DSMCC format for data files is a standard adapted in particular for use in multimedia networks and which defines a series of message formats and session commands for communication between a client user 70, a server user 71 and network resource manager 72. See FIG. 6. The network resource manager 72 may be considered as logical entity acting to manage the attribution of resources within a network. Although initially conceived for use in the context of bidirectional network communication, recent implementations of the DSM-CC standard have focused on its use for unidirectional broadcast purposes.

Figure 6:
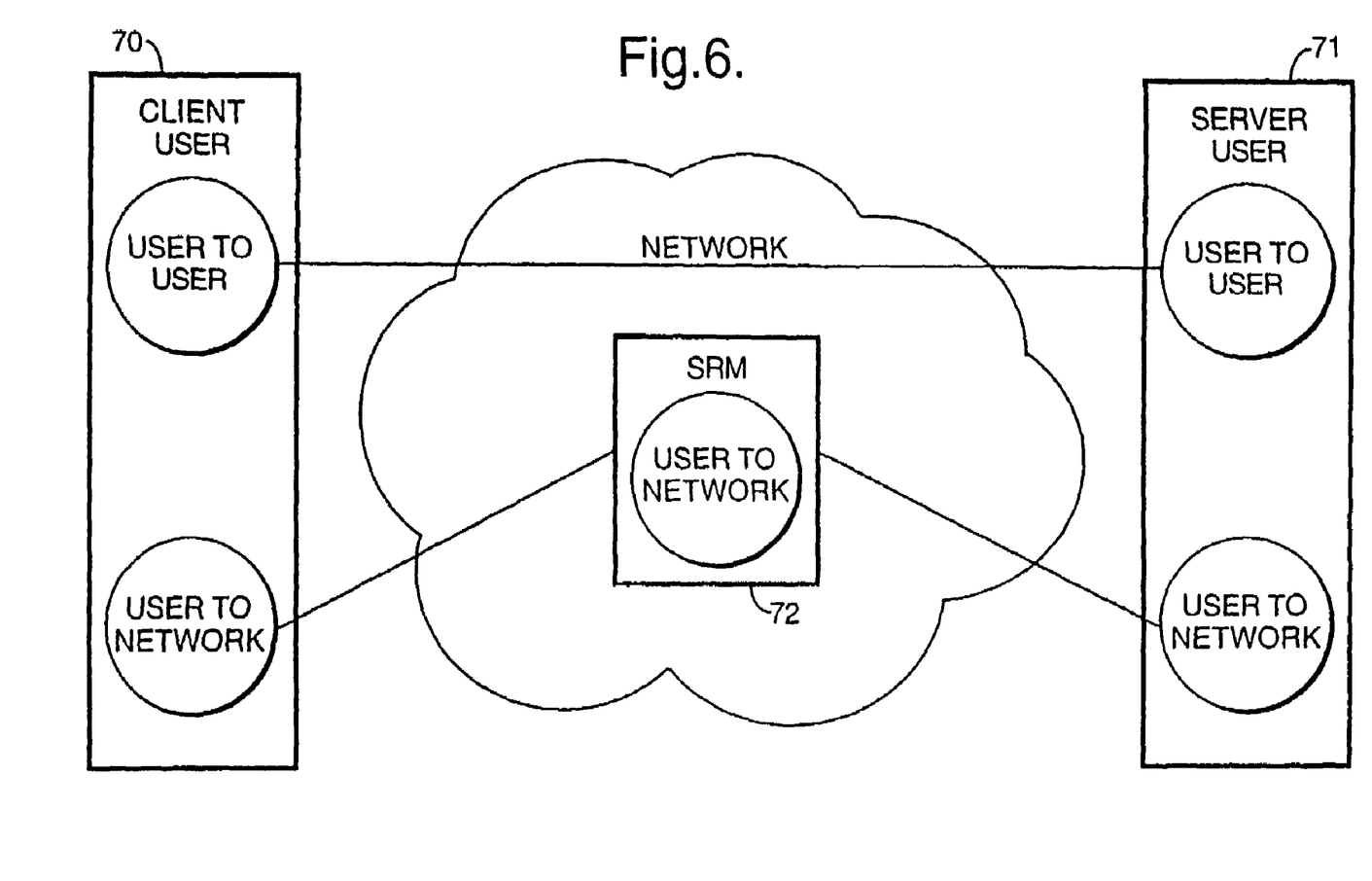
FIG. 6 shows the client, server, network manager relationship as defined in the context of DSMCC.

Communication between a client and a server is set up by a series of sessions, a first series of messages being exchanged between a user (client 70 or server 71) and the network manager 72 in order to configure the client and/or server for communication. Such messages are formatted according to the so-called DSMCC U–N (user to network) protocol. A subset of this protocol has been defined in particular for broadcast downloading of data.

Once a communication link has been established, messages are subsequently exchanged between client 70 and server 71 according to the DSMCC U—U (user to user) protocol). A sequence of messages of this kind correspond to the data files 60 of FIG. 5. In the case of DSMCC U—U messages, data is organised in a series of messages 61 grouped according to the BIOP or Broadcast InterOrb Protocol.

Each message or object 61 comprises a header 62, a sub-header 63 and a payload 64 containing the data itself. In accordance with the BIOP protocol, the header 62 contains, inter alia, an indication of the type of message and the BIOP version whilst the sub-header indicates the type of object and other information to be defined by the system architect.

Data objects 64 within the payload of DSMCC U—U files may generally be defined as one of three types; directory objects, file objects and stream objects. Directory objects define root directories or subdirectories used to reference a series of associated file objects containing the actual application data.

Stream objects may be used to enable a temporal relationship to be established between data contained in the data files and the MPEG packet stream itself. This may be used, for example, in the case of interactive applications contained in the data files and designed to be synchronised with the elementary video or audio streams received and processed by the decoder. As mentioned above, there may otherwise be no direct correlation between the MPEG packetised data and the data files.

Unlike the MPEG tables, where a single directory references a set of tables with only a single level of hierarchy, the data files 60 may be organised in a rather more complex hierarchical manner. As with files stored in a PC or server, a main or root directory may refer to one or more subdirectories which refer in turn to a second level of data files. Reference may even be made to a second root directory associated with another set of application data.

Figure 7:
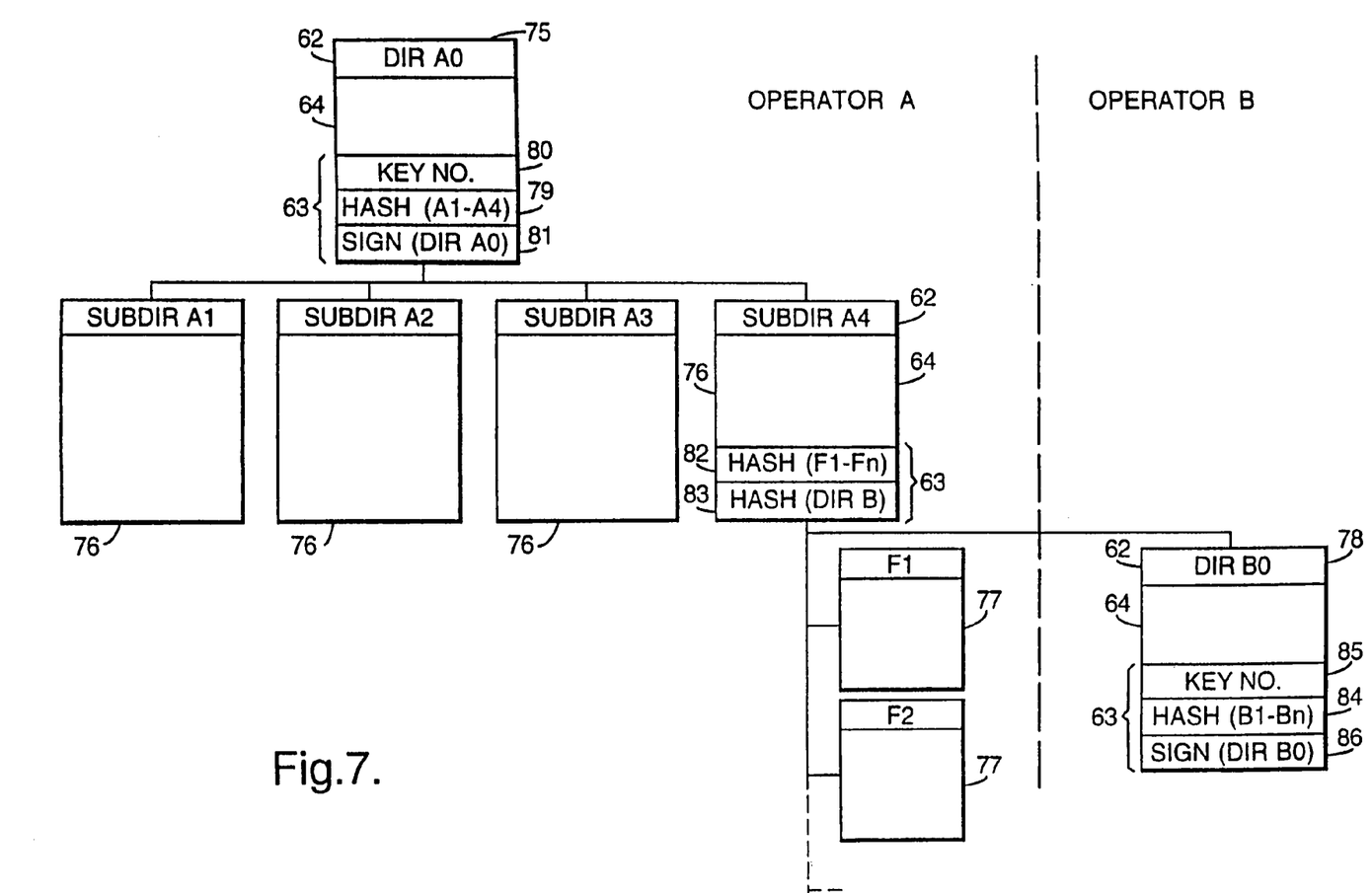
FIG. 7 shows the authentified directory, subdirectory and file objects in this embodiment of the invention.

Referring to FIG. 7, an example of file structure for a set of data files or units is shown. A root directory DIR A0 indicated at 75 references a group of subdirectories A1 to A4 indicated at 76. Each subdirectory 76 references one or more sets of associated object files 77. For the sake of clarity only a single group of object files F1, F2 etc. associated with the subdirectory A4 is shown. In practice a number of groups of object files may be referenced by each of the subdirectories A1 to A4.

Within each directory and subdirectory a set of authentification steps is introduced for the files linked to that directory. Referring to the root directory 75, the subheader 63 comprises a hash value obtained by applying a hash algorithm to some or all of the data stored in the subdirectory files A1 to A4 indicated 76. The hashing algorithm used may be of any known type such as, for example, the Message Digest algorithm MD5.

In one realisation, the algorithm may be applied to each associated file or subdirectory individually and a list of the hash values for each subdirectory 76 stored in the root directory 75 prior to transmission. However, whilst such a solution enables an increased degree of checking resolution in terms of verifying each subdirectory, this solution may be rather inefficient in terms of the processing time necessary for the decoder to calculate the corresponding signatures.

Accordingly, the subheader 63 of the directory 79 preferably comprises a cumulative hash value 79, calculated by applying the MD5 hashing algorithm to the combined subheader and payload sections 63, 64 of the subdirectories 76, that is, without the header 62. In particular, the hash values 82 contained within the subdirectories 76 and referring to the layer of file objects 77 are included in this hashing calculation.

In the case of the subdirectory A4 shown in FIG. 7, this subdirectory itself refers to a set of object files F1–Fn indicated at 77. In this case, a cumulative hash value 82 is generated for the combined contents of the object files 77. This value is included in the hashing process giving rise to the hash value 79. It is therefore not possible to change any of the object files 77 without changing the hash value 82 of the subdirectory 76, which in turn will change the hash value 79 of the directory 75.

In the present case, a combined hash value is calculated for all of the subdirectories A1–A4 referenced in the directory. This hash value is stored together with an identifier of the group of subdirectories from which the data has been taken. In other embodiments, a series of combined or individual hash values and corresponding identifiers may be stored in the subheader of the directory.

For example, a second set of subdirectories, also associated with the root directory but relating to a different set of data or executable code may also be grouped together and a cumulative hash value calculated for these subdirectories calculated and stored in the subheader root directory. A single hash value associated with a single directory may equally be stored in the subheader of the root directory.

The authorisation of groups or individual data files does not of course prevent the root directory (or, indeed, any other file) from also referring to non-validated or unhashed data files, but the absence of validation of such a file will need to be taken into account in any operations with this file. In this regard, it may not be necessary, for example, to authenticate stream objects.

The use of a hashing function in this case primarily enables the decoder to verify the integrity or completeness of the downloaded data files. In the case, for example, of a fault or break in the transmission, the operation of a cumulative hashing algorithm on the received dependent files will not give the same result as the hash value for these files stored in the root directory. The decoder will then be alerted to the presence of possible errors in the downloaded data and will reload the faulty data files.

As will be appreciated, in the case of a hashing algorithm, the calculation of the hash value is carried out according a publically known series of calculation steps and, as such, anyone can generate the hash value for a given set of data files. It is thus not normally possible to verify the origin of such data files by simply checking the hash values.

To overcome this problem, a signature value for the root directory 75 is calculated using a secret key value known only to the operator. This key may correspond to a key obtained by a symmetric key algorithm, such as the Data Encryption Standard or DES algorithm. However, preferably a private/public key algorithm such as the Rivest, Shamir and Alteman or RSA algorithm is used, the operator responsible for producing the data files possessing the private key value, the public key values being held by the decoders.

As shown in FIG. 7, the root directory 75 comprises a key identifier or magic number 80 that will identify to the decoder the public key to be used in the verification stage together with the calculated signature value 81 generated using the private key of the operator. In this case, the signature value 81 is generated by applying the private key held by the operator to some or all of the data within the directory 75, preferably including the payload data 64 and/or the cumulative hash value or values 79. The decoder can then verify this signature value 81 using the corresponding public key identified by the key number 80.

In this example, the data in the directory 75 is unencrypted and the private key is simply used to provide a signature value verifiable by the public key. In alternative embodiments, some or all of the contents of the directory may be encrypted by the private key and thereafter decrypted by a corresponding key.

In either case, the generation of a signature value or block of encrypted code by use of a secret key enables a decoder to verify the integrity and origin of the directory 75 and, by implication, the integrity and origin of the files referred to by this root directory. Since the cumulative hash values for the referred files are included in the calculation of the signature 81 it is not possible to alter these values without this being detected at the verification stage. Since each hash value is generally unique to a given set of data, it would therefore not be possible to change the content of any of dependent hashed files without changing their characteristic hash value and, thereby, the resulting signature value of a directory.

The root directory 75, subdirectories 76 and object files 77 are all generated by one broadcast operator of the system, indicated here as operator A. In this case, these files will all have a known and verifiable common origin.

However, depending on the application to be implemented, reference may equally be made to a set of data files associated with a second operator B. In this case, the subdirectory 76 includes a reference to the root directory DIR B0 of a second set of data files, indicated at 78. It is also possible to envisage connections between data files from different sources at other levels, for example, a file hierarchy in which a first subdirectory in one set of files refers to subdirectory of a second set of data files etc.

As with the root directory DIR A0 for the operator A, the DIR B0 root directory indicated at 78 includes one or more cumulative hash code values 84 associated with its associated subdirectories (not shown), a key number 85 identifying the public key of the operator B to be used in the verification step and a signature value 86 generated by the corresponding operator private key.

A hash value for this directory is calculated using the hash value 84 and signature 86 in the subheader of the directory and the payload data 64 of the directory 78 as well. This hash value is then stored in the subdirectory A4 thereby enabling a verification of the integrity of the data in the directory table to be carried out.

Due to the fact that the signature 86 and hash values 84 are included in the calculation of the hash value 83, the integrity of the rest of the data files referred to by the root directory 78 may also be assumed, since none of these dependent files may be changed without changing the hash value 84 and, more importantly, the signature value 86. Since the signature value 86 is only calculable by a person possessing the private operator key the integrity of all files referred to by the directory 78 may be assumed, assuming corresponding hash values are calculated for further dependent subdirectories and object files.

In this way, application data relating to executable programs or the like generated by a second operator may be interlinked with applications associated with a first operator in a secure and reliable manner.

As will be appreciated, a number of variations may be possible, notably to reduce the amount of data hashed or signed at each stage. In particular, in the case of a signature or hash value in a directory or subdirectory used to verify a lower level data file, the directory signature or hash value may be gene rated using only the lower level hash value and no other data.

For example, the combined hash value 79 in the A0 directory 75 may be generated using the combined hash values 82, 83 of each of the A1–A4 subdirectories indicated at 76. Since these values are just as unique as the data in the payloads of the subdirectory, the combined hash value 79 will still be unique to the subdirectories in question. Furthermore, the integrity of the lower level of object and directory files 77, 78 may still be assumed since the hash values 82 are still used in the calculation.

Equally, the hash value 82 calculated to verify the B0 directory indicated at 78 may be calculated simply using the signature value 86. Since this is dependent on and uniquely associated with the hash values 84, which hash values are in turn dependent on the next level of files, the integrity of the whole of the sets of data files referred to by the directory 78 may still be assumed.

The invention claimed is:

1. A method of authenticating data, comprising:
   organizing the data into a hierarchical structure comprising a root directory unit, at least one subdirectory unit, and at least one file unit;
   authenticating data in the at least one file unit using a first authentication algorithm, resulting in an associated file authentication value being stored in a referring subdirectory, wherein the referring subdirectory is a subdirectory hierarchically above the at least one file unit; and
   authenticating the associated file authentication value using a second authentication algorithm, resulting in an associated subdirectory authentication value being stored in the root directory unit,
   transmitting the data as digital data in a digital transmission system, wherein the data includes the at least one file unit and the hierarchical structure comprising the file authentication value and the subdirectory authentication value.

2. The method of claim 1, wherein the first authentication algorithm is a hashing algorithm applied to some or all of the data in the at least one file unit, and wherein the associated file authentication value is a hash value stored in the referring subdirectory.

3. The method of claim 2, wherein the hashing algorithm corresponds to a cryptographically secure algorithm that generates a substantially unique hash value from a give set of data.

4. The method of claim 1, wherein the first authentication algorithm is a hashing algorithm applied to an accumulation of data from a plurality of file units to generate a single hash value.

5. The method of claim 1, wherein the second authentication algorithm is a hashing algorithm applied to at least the file authentication value, and wherein the associated subdirectory authentication value is a hash value stored in the root directory unit.

6. The method of claim 1, wherein the second authentication algorithm is a hashing algorithm applied to an accumulation of file authentication values from a plurality of subdirectories to generate a single hash value.

7. The method of claim 1, wherein at least some of the data stored in the root directory unit is authenticated using a secret key associated with an encryption algorithm, resulting in an encryption value being stored in the root directory unit.

8. The method of claim 7, wherein the encryption value corresponds to a digital signature generated using a private key of the encryption algorithm, wherein the digital signature is verified using a public key corresponding to the private key.

9. The method of claim 1, wherein a referring unit includes an encrypted value generated by a secret key, and wherein an authentication value associated with the referring unit is calculated based on the results of an authentication algorithm performed on the encrypted value and stored in the referring unit.

10. The method of claim 9, wherein a signature value for the referring unit is generated by an encryption algorithm, wherein a hashing algorithm is applied to the signature value to generate the authentication value.

11. The method of claim 9, wherein the referring unit comprises one selected from the group consisting of a subdirectory unit and a file unit.

12. The method of claim 9, wherein the referring unit is a second root directory unit.

13. The method of claim 1, wherein the root directory unit, at least one subdirectory unit, and at least one file unit correspond to a set of data files, wherein the data files are encapsulated in data tables, and wherein the data tables are further encapsulated in data packets to form a transport stream.

14. The method of claim 13, wherein the root directory unit, at least one subdirectory unit, and at least one file unit correspond to data objects formatted according to the DSMCC standard.

15. The method of claim 13, wherein the encapsulation of the data files and the data tables conform to the MPEG standard.

16. The method of claim 1, wherein the digital transmission system corresponds to a digital television system.

17. A method for verification of received data sent in a digital transmission system, comprising:
    receiving the data organized into a hierarchical structure comprising a root directory unit, at least one subdirectory unit, and at least one file unit,
    wherein the received data comprises a file authentication value resulting from applying a first authentication algorithm to data in the at least one file unit, wherein the file authentication value is stored in a referring subdirectory, and
    wherein the received data further comprises a subdirectory authentication value resulting from a second authentication algorithm applied to the file authentication value, wherein the subdirectory authentication value is stored in the root directory unit;
    authenticating the received data in a file using the first authentication algorithm to obtain a first resulting value;
    comparing the first resulting value with the file authentication value stored in the referring subdirectory, wherein the referring subdirectory is a subdirectory hierarchically above the file;
    authenticating the file authentication value stored in the referring subdirectory using the second authentication algorithm to obtain a second resulting value; and
    comparing the second resulting value with the subdirectory authentication value stored in the root directory unit to verify the received data.

18. An apparatus for authenticating data, configured to:
    organize the data into a hierarchical structure comprising a root directory unit, at least one subdirectory unit, and at least one file unit;
    authenticate data in the at least one file unit using a first authentication algorithm, resulting in an associated file authentication value being stored in a referring subdirectory, wherein the referring subdirectory is a subdirectory hierarchically above the at least one file unit; and
    authenticate the associated file authentication value using a second authentication algorithm, resulting in an associated subdirectory authentication value being stored in the root directory unit,
    transmitting the data as digital data in a digital transmission system, wherein the data includes the at least one file unit and the hierarchical structure comprising the file authentication value and the subdirectory authentication value.

19. A receiver/decoder for verification of received data sent in a digital transmission system, wherein the receiver/decoder is configured to:
  receive the data organized into a hierarchical structure comprising a root directory unit, at least one subdirectory unit, and at least one file unit,
  wherein the received data comprises a file authentication value resulting from applying a first authentication algorithm to data in the at least one file unit, wherein the file authentication value is stored in a referring subdirectory, and
  wherein the received data further comprises a subdirectory authentication value resulting from a second authentication algorithm applied to the file authentication value, wherein the subdirectory authentication value is stored in the root directory unit;
  authenticate the received data in a file using the first authentication algorithm to obtain a first resulting value;
  compare the first resulting value with the file authentication value stored in the referring subdirectory, wherein the referring subdirectory is a subdirectory hierarchically above the file;
  authenticate the file authentication value stored in the referring subdirectory using the second authentication algorithm to obtain a second resulting value; and
  compare the second resulting value with the subdirectory authentication value stored in the root directory unit to verify the received data.

* * * * *